April 14, 1942.　　　G. F. DRAKE　　　2,279,305
THERMOSTAT
Filed Jan. 17, 1938　　　2 Sheets-Sheet 1
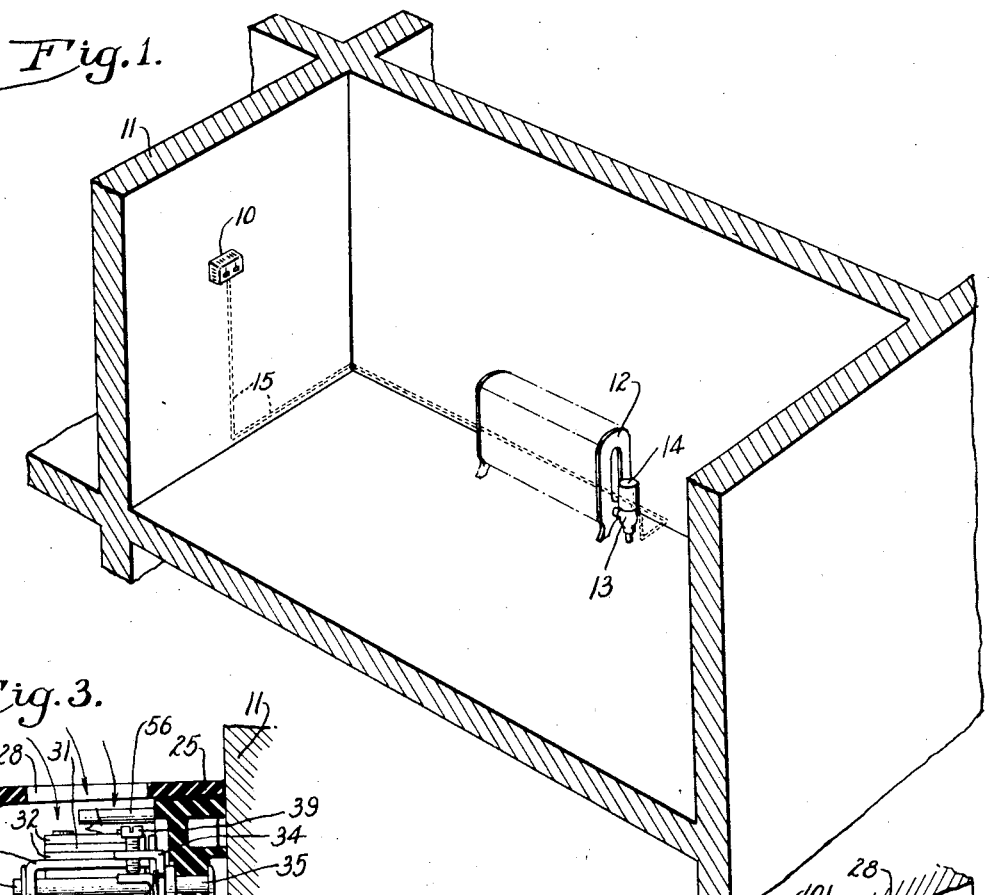
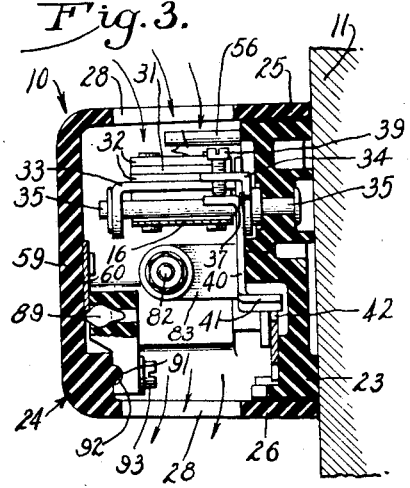
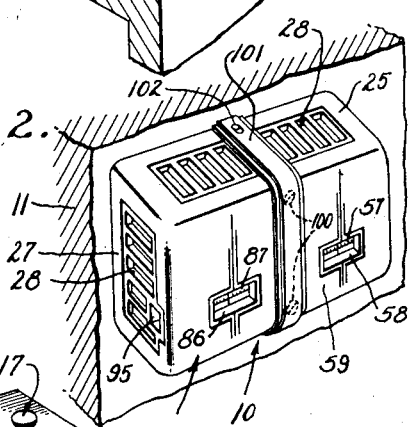
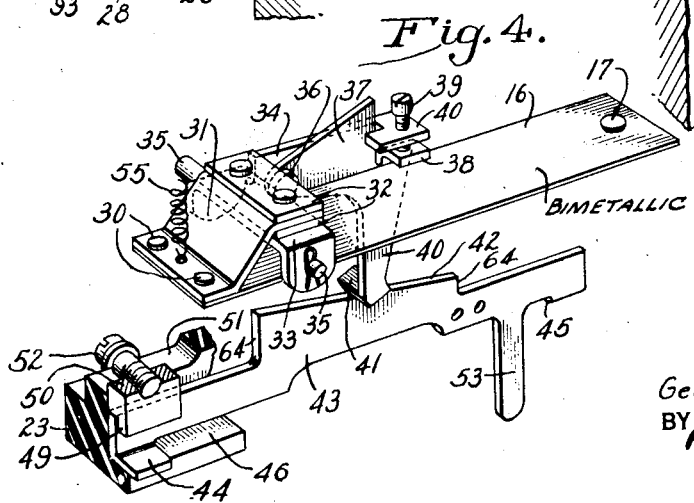
INVENTOR
George Forrest Drake
BY Parker, Carlson, Pitzner & Hubbard
ATTORNEYS April 14, 1942.   G. F. DRAKE   2,279,305
THERMOSTAT
Filed Jan. 17, 1938    2 Sheets-Sheet 2
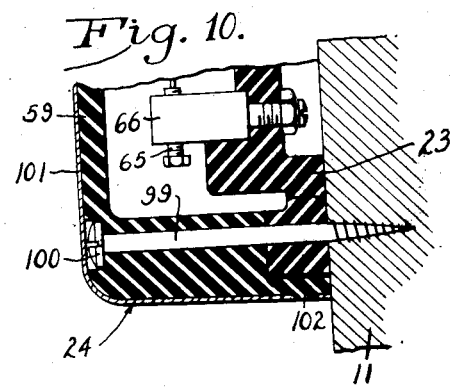
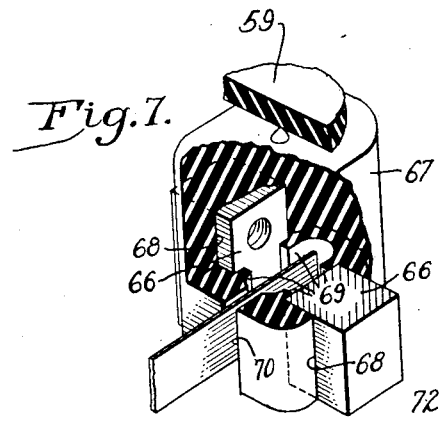
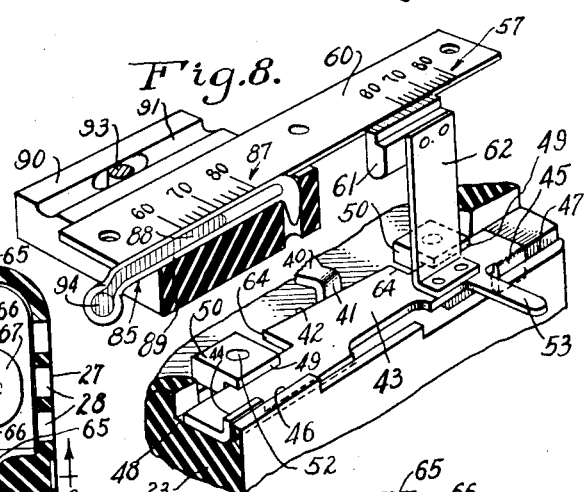
INVENTOR
George Forrest Drake
BY
Parker, Carlson, Pitzner & Hubbard
ATTORNEYS Patented Apr. 14, 1942

2,279,305

UNITED STATES PATENT OFFICE 2,279,305

THERMOSTAT

George Forrest Drake, Rockford, Ill., assignor to Barber-Colman Company, Rockford, Ill., a corporation of Illinois Application January 17, 1938, Serial No. 185,388

9 Claims. (Cl. 200—139)

This invention relates generally to condition control instruments such as thermostats and more particularly to those of the bimetallic type which are adapted to be mounted on the wall of a room and utilized to control an apparatus for changing the temperature of the room air.

The general object of the invention is to provide a room thermostat possessing substantially greater speed of response to ambient temperature changes than prior room thermostats.

A more detailed object is to correlate the construction and position of the bimetallic element of the thermostat with the room environment so that the natural circulation of air inherently occurring in the room being conditioned may be utilized to advantage in increasing the sensitivity of the thermostat.

Another object is to provide a thermostat having control switches of the open contact type protected in a novel manner against fouling of the contact surfaces by dust particles.

A further object is to provide, in a thermostat of the above general character, a temperature indicating thermometer protected in a novel way against false heating by the auxiliary electric heater sometimes associated with such thermostats.

The invention also resides in the novel mounting of the thermostatic element and the construction of the adjusting mechanism therefor.

Other objects and advantages of the invention will become apparent from the following detailed description taken in connection with the accompanying drawings, in which Figure 1 is a fragmentary perspective view of a room and temperature changing apparatus controlled by a thermostat embodying the novel features of the present invention.

Fig. 2 is a perspective view of the thermostat.

Fig. 3 is a vertical sectional view taken approximately on the line 3—3 of Fig. 5.

Fig. 4 is a fragmentary perspective view of the main operating parts.

Fig. 5 is a section taken along the line 5—5 of Fig. 6.

Fig. 6 is a section taken along the line 6—6 of Fig. 5.

Fig. 7 is a fragmentary perspective view of a portion of the switch mechanism.

Fig. 8 is a fragmentary perspective view showing the indicating and adjusting mechanisms.

Fig. 9 is a detail section taken substantially along the line 9—9 of Fig. 6.

Fig. 10 is a section taken along the line 10—10 of Fig. 5.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

Referring now to the drawings, the improved room thermostat 10 is mounted on a wall 11 of a room and arranged to control the operation of an apparatus for changing the temperature of the air within the room. The apparatus may, for example, be a radiator 12 supplied with temperature changing medium under the control of a valve 13 which is actuated by a power driven operator 14 controlled from the thermostat through the medium of connections indicated at 15 and extending between the thermostat and the valve operator.

In the present instance, the thermostat is of the electric type comprising generally a strip 16 of bimetallic material adjustably supported from one end and carrying at its free end a contact 17 having oppositely facing surfaces 18 and 19 which cooperate with stationary contacts 20 to form electric control switches 21 and 22. The thermostatic element and the contacts as well as the other operating parts of the instrument are mounted on a base 23 of molded insulation which cooperates with a removable and generally rectangular cover 24 to form a casing for the operating parts. The top, bottom, and side walls 25, 26, and 27 are formed with openings 28 to permit of free circulation of the room air through the casing.

Room thermostats of the above character are positioned at about eye level and fastened against a wall of the room usually on the side opposite the temperature changer or the point of discharge of temperature changing medium into the room. The thermostat is thus disposed in the natural path of circulation of the room air which has been found to move vertically along and adjacent the surface of the wall or any other vertical surface of relatively large area. The present invention aims to take advantage of this condition and utilize the same in obtaining optimum speed of response of the thermostat to ambient temperature changes. To this end, the bimetallic strip 16 is made substantially straight and flat with a relatively large ratio of surface area to volume of the metal and is mounted in the upper part of the casing in a substantially horizontal plane when the casing is attached to the wall in the intended position.

The strip is thus disposed broadwise to the direction of current of air which moves downwardly through the casing as indicated by the arrows in Fig. 3. A surface of maximum effective area thus obstructs the downward air flow with the result that changes in the room temperature are communicated quickly to the metal of the strip.

The desired large ratio of surface area to volume of bimetallic material used is obtained by making the strip 16 of substantial width (11/16 of an inch) and relatively thin (0.021 of an inch). Thus, the ratio of surface area to metal volume is approximately twice as great, about thirty-four in the present instance, as the ratio commonly used in the construction of prior room thermostats.

The high sensitivity of the present thermostat is also due in part to the fact that the strip 16 is disposed with the metal layer 16' (Fig. 9) of higher expansibility facing upwardly. Thus, changes in the temperature of the downwardly moving air current are communicated to this layer directly rather than by conduction.

To provide for manually varying the control point of the thermostat, the end of the strip 16 opposite the switches is secured by rivets 30 to one end of a bracket 31 overlying the end portion of the strip. The other end of the bracket is disposed between two insulating pads 32 and clamped to an arm 33 projecting forwardly from a plate 34 and cooperating therewith to form a yoke which is pivoted on a stud 35 anchored in the base 23. The bimetallic strip and the plate 34 are thus adapted to swing as a unit about an axis defined by the pin 35 and disposed intermediate the ends of the strip and closely to the plane of the latter. For any position of the plate 34, the supported end of the strip is fixed so that the contact end moves upwardly and downwardly as the temperature of the strip falls and rises respectively relative to the thermostat setting.

Carried by the plate 34 at a point spaced from the pivot 35 is a stud 36 pivotally supporting a lever 37 which has a lug 38 thereon bearing against the end of an adjusting screw 39 threading through a lug 40 on the plate 34. The lever 37 also has a depending arm 40 with a flange 41 thereon which bears against a cam surface 42 on a bar 43 mounted on the base 23 for endwise movement. The bar slides in a slot 48 (Fig. 8) in the base 23 and has oppositely projecting lugs 44 and 45 formed thereon and cooperating with guides 46 and 47. The bar is held against the base by overlying flanges 49 on blocks 50 which are adjustable along slots 51 in the base and clamped against the latter by screws 52 (Fig. 4) threading into the blocks.

An arm 53 rigid with the slide bar 43 projects downwardly through a slot 54 in the cover 24 and constitutes a handle by which the bar may be adjusted endwise. The cam surface 42 is inclined relative to the horizontal so that by shifting the bar, the lever 40, the plate 37, the bracket 31, and the strip 16 are swung as a unit about the pivot pin 35 thereby correspondingly changing the setting of the thermostat. A contractile spring 55 stretched between the bracket 31 and a post 56 serves to take up lost motion and urge the lever against the cam 42.

The setting of the thermostat is indicated on a scale 57 visible through a window 58 in the front wall 59 of the cover 24. The scale is on a bar 60 secured to the inner surface of the wall 59 and cooperates with an indicator 61 of contrasting color on the end of a forwardly projecting post 62 rigid with the adjusting slide 43. Thus, the scale reading in degrees indicates the position of the slide 43 and therefore the ambient temperature at which the condition of the control switches will be changed. The range of adjustment of the thermostat is determined by the positions of the blocks 50 which act as limit stops and cooperate with shoulders 64 on the slide 43.

It will be observed that the pivot 35 about which the strip 16 swings during manual adjustment is disposed intermediate the ends of the strip and is spaced a substantial distance from the supported end of the latter. By virtue of such arrangement coupled with the location of the pivot close to the strip, the reduction in the effective width of the air gap between the switch contacts due to curvature of the strip under temperature changes and changes in the thermostat setting is decreased substantially.

The stationary contacts 20 are carried on the ends of screws 65 threading into posts 66 which project rigidly from the base and preferably are of square cross-section. Means formed separate from the cover 24 is provided for enclosing the contacts of the control switches so as to prevent fouling of the latter by dust particles. Herein, this means comprises a housing 67 of molded insulation having slots 68 in opposite side walls adapted to snugly receive the contact posts 66, being held against movement laterally of the thermostatic strip by ribs 69 which interlock with the sides of the posts. The bimetallic strip projects through a slot 70 in the housing having a width somewhat greater than the range of movement of the switch contact 17 plus the thickness of the strip. When the housing 67 is positioned on the posts as shown in Figs. 5, 7, and 9, the contact surfaces are enclosed except for the slot 70 which, it will be observed, is in a vertical wall of the casing and therefore not in the direct path of dust particles carried by the air moving downwardly through the thermostat casing. In the assembled thermostat, the cover mold 59 bears against the end of the dust housing and holds the latter against the base (see Fig. 7). The housing may be slipped off from the parts readily to permit of inspection or adjustment of the contacts. By forming the housing separate from the cover 24, any possibility of bending or displacement of the parts as an incident to assembling the thermostat casing is avoided.

Dust particles which do settle on the upper surface of the thermostatic strip exteriorly of the housing are prevented from creeping along the strip and onto the upper surface 18 of the contact 17. This is accomplished by spacing this contact surface above the strip with its outer periphery overlying the strip so as to form an annular pocket 71 (Fig. 9). Any particles which do creep along the strip will collect and be retained in this pocket.

By thus preventing the accumulation of dust on the contact surfaces, the possibility of these surfaces becoming separated mechanically is avoided effectually. Accordingly, it is possible to obtain effective electrical contact between the coacting surfaces by employing lower contact pressures than would otherwise be required. This in turn makes possible the desired decrease above described in the thickness of the thermostatic strip 16 so as to obtain a larger effective surface area and therefore greater sensitivity of the thermostat. These factors together with the arrangement of the thermostatic strip in a horizontal plane combine to render the thermostat construction much more sensitive to changes in the ambient temperature than the bimetallic room thermostats heretofore used.

The inner ends of the posts 66 which project through the base 23 are threaded and provide terminals on the rear side of the base to which lead-in conductors may be attached. The connection with the common switch contact 17 is through a short end portion of the strip 18 and a very flexible conductor 73 having one end soldered to the under side of the strip near the free end thereof so that the current carried by the thermostat switches will not flow through any substantial length of the bimetallic strip and produce objectionable false heating thereof. The other end is fastened to a post 74 anchored in the base 23 near the fixed end of the strip 16 and providing the third terminal on the rear side of the base. The conductor 73 is a fine braided wire which in view of its extreme flexibility and the fact that it extends substantially parallel to the strip imposes substantially no force on the strip throughout the range of movement of the latter. In addition, the arrangement avoids any possibility of contact with the metal parts.

Both metals of which the thermostatic strip 16 is composed are of the magnetic character. Advantage is taken of this property and the strip itself is utilized to perform the additional function of constituting the armature of a magnet for causing movement of the common switch contact with a snap or detent action. Herein, the magnet comprises two alined pole pieces 75 of permanently magnetized material supported in a yoke 76 which is fastened to the base 23. The opposed pole faces 77 are disposed in parallel planes and spaced apart so that the gaps between the pole faces and the armature surfaces are somewhat wider than the range of movement of the switch contact 17. The contacts 20 are adjusted so that the strip 16 is disposed on the magnetic center of the gap between the pole faces when the contact 17 is midway between the contacts 20.

The thermostat may be equipped with an auxiliary electric heater 80 which preferably comprises a resistance coil wound on an insulating spool 81. The latter is fastened by a bolt 82 to the forwardly projecting arms of L-shaped brackets 83 secured to the base 23 by screws 84 and insulated from each other. Opposite ends of the coil are connected to the brackets the screws of which provide electrical terminals on the rear side of the base.

A constant indication of the ambient temperature is given by a thermometer 85 concealed within the thermostat casing with its scale 87 visible through a window 86 in the front wall 59 of the cover. The scale is formed on the bar 68 and cooperates with a column 88 (Figs. 6 and 8) of expansible fluid in a horizontal glass tube 89 which is mounted in and substantially enclosed by an insulating member 90 slidable along the rear surface of the cover wall 59. In this movement the member is guided by a rib 92 (Fig. 3) on the cover entering a groove 91 in the member, the latter being fastened to the cover by a screw 93 after calibration of the thermometer.

The bulb 94 of the thermometer is disposed within a recess 95 (Figs. 2 and 6) in one side wall of the cover and opening outwardly. The bulb is thus exposed to the air exteriorly of the thermostat casing and is effectively insulated against heating by radiation from the electric heater 80.

To discourage tampering by unauthorized persons, the base 23 and the cover 24 are, after adjustment of the thermostat and the thermometer at the factory, secured together by screws 96 (Fig. 6) extending through the base and the threading into metal inserts 97 molded into the cover. The screw heads are seated in recesses 98 which may, if desired, be sealed. The assembled thermostat is fastened on the room wall by screws 99 (Fig. 10) extending through the cover and base and having heads 100 seated in the cover and concealed beneath ornamental band 101. The latter is apertured to receive plugs 102 formed integral with the cover and acting to secure the band against the cover with a snap fit.

Means is provided for insuring accurate positioning of the adjustment indicator 61 and the scale 57 when the base 23 and the cover 24 are assembled in spite of inherent manufacturing variations in the dimensions of the molded parts. To this end, the periphery of the cover is made somewhat larger than the base 23 so as to fit loosely over the latter. A dowel plug 103 (Fig. 6) is molded onto the base around the screw hole which is adjacent the indicator 61 and this dowel is adapted to fit snugly into a recess 104 on the cover and thereby locate the cover laterally of the base during assembly of the two. Since the dowel and recess can readily be molded to fit accurately and are disposed close to the indicator 61 and the scale 57, the effect of manufacturing variations on the accuracy of the adjustment reading will be reduced to a minimum.

I claim as my invention:

1. A thermostat adapted to be mounted on the wall of a room and having a horizontally extending contact carrying element movable vertically in response to ambient temperature changes, a contact cooperating with the contact of said element, a housing enclosing said element and apertured for the circulation of air therearound, a closure within said housing around said contacts and one end portion of said element, and means within said housing operable to prevent dust particles settling on said element exteriorly of the housing from creeping along the element and onto the active surfaces of said contacts.

2. A room thermostat having, in combination, a support adapted to be secured to the wall of a room, an elongated arm supported at one end from said support and disposed substantially horizontally when the thermostat is mounted on said wall, the free end of said arm moving vertically in response to ambient temperature changes, a housing enclosing the free end portion only of said arm, and an electrical contact carried by said free end within said housing and providing an upwardly facing contact surface disposed above the upper surface of said arm so as to prevent dust particles on the latter creeping into said housing along the upper surface of said arm from coming onto said contact surface.

3. A room thermostat having, in combination, a support adapted to be secured to the wall of a room, an elongated arm supported at one end from said support and disposed substantially horizontally when the thermostat is mounted on said wall, the free end of said arm moving vertically in response to ambient temperature changes, an electrical contact carried by said free end and providing an upwardly facing contact surface disposed above the upper surface of said arm so as to prevent dust particles on the latter from creeping onto said contact surface, and means providing a closure around said contact and operating to prevent dust particles from settling thereon.

4. A thermostat adapted to be mounted on the wall of a room and having a horizontally extending contact carrying element movable vertically in response to ambient temperature changes, a contact cooperating with the contact of said element, a casing enclosing said element and having walls apertured for the free circulation of air around the element, a separate housing within said casing enclosing said contacts and one end portion of said element, and means within said housing operable to prevent dust particles settling on said element from creeping along the element and onto the active surfaces of said contacts.

5. A condition responsive instrument having, in combination, a base, a perforated cover telescoping loosely with said base and cooperating therewith to define a chamber, a condition responsive means within said chamber mounted on said base, mechanism on said base including a member movable manually to change the control point of the instrument, an element movable with said member, an element on said cover cooperating with said first element to indicate the setting of the instrument, and dowel means formed on the cover and base respectively adjacent the respective elements and interengageable during assembly of the base and cover to effect accurate positioning of said elements relative to each other.

6. A condition responsive instrument having, in combination, a base, a perforated cover telescoping loosely with said base and cooperating therewith to define a chamber, a condition responsive means within said chamber mounted on said base, mechanism on said base including a member movable manually to change the control point of the instrument, an element movable with said member, an element on said cover cooperating with said first element to indicate the setting of the instrument, and interengaging means acting during assembly of the base and cover to effect accurate relative positioning of said elements in spite of manufacturing variations in the sizes of the base and cover.

7. The combination with apparatus for changing the temperature of the air in a room having a relatively large vertical wall surface of, a thermostat having a thermosensitive element comprising an elongated thin and substantially flat strip of bimetallic material and a hollow casing enclosing and supporting said strip and apertured on opposite sides to provide a passage permitting the flow of air currents through the casing broadwise of said strip and obstruction of such currents by substantially the entire surface of the strip, said casing being mounted closely adjacent said wall with said strip disposed substantially horizontally and said passage extending vertically so as to expose substantially the entire surface of said strip to the air currents induced to flow vertically along said wall.

8. The combination with apparatus for changing the temperature of the air in a room having a relatively large vertical wall surface of, a thermostat having an elongated substantially straight thermosensitive element, and a hollow casing enclosing and supporting said element and apertured on opposite sides to provide a passage permitting air currents to flow through the casing broadwise of said element and obstruction of such currents by substantially the entire surface of the element, said casing being mounted closely adjacent said wall with said element disposed substantially horizontally and said passage extending vertically so as to expose substantially the entire surface of the element to the air currents induced to flow vertically along said wall.

9. The combination with apparatus for changing the temperature of the air in a room having a vertical wall surface of, a thermostat having an elongated substantially straight thermo-sensitive element, a sensitive open switch having a stationary contact and a cooperating movable contact carried by the free end of said element, a hollow casing enclosing and supporting said element and apertured on opposite sides to provide a passage permitting air currents to flow through the casing broadwise of said element and obstruction of such currents by substantially the entire surface of the element, said casing being mounted closely adjacent said wall with said element disposed substantially horizontally and said passage extending vertically, and means within said casing providing a closure around said switch and the end of said element for excluding dust from said contacts without obstructing said vertical passage.

GEORGE FORREST DRAKE.